(12) United States Patent
Mizoguchi et al.

(10) Patent No.: US 12,521,830 B2
(45) Date of Patent: Jan. 13, 2026

(54) MACHINING ACCURACY DIAGNOSING DEVICE AND MACHINING ACCURACY MANAGEMENT SYSTEM FOR MACHINE TOOL

(71) Applicant: OKUMA CORPORATION, Niwa-Gun (JP)

(72) Inventors: Yuji Mizoguchi, Niwa-Gun (JP); Takashi Norihisa, Niwa-Gun (JP); Toshihiko Murahashi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 268 days.

(21) Appl. No.: 18/155,842

(22) Filed: Jan. 18, 2023

(65) Prior Publication Data
US 2023/0241740 A1    Aug. 3, 2023

(30) Foreign Application Priority Data
Feb. 1, 2022    (JP) .................................. 2022-014458

(51) Int. Cl.
| | |
|---|---|
| *G06F 11/30* | (2006.01) |
| *B23Q 11/14* | (2006.01) |
| *B23Q 15/18* | (2006.01) |
| *G01M 99/00* | (2011.01) |

(52) U.S. Cl.
CPC ............ *B23Q 15/18* (2013.01); *B23Q 11/148* (2013.01); *G01M 99/005* (2013.01); *B23Q 2717/00* (2013.01)

(58) Field of Classification Search
CPC ..................................................... B23Q 15/18
See application file for complete search history.

(56) References Cited

FOREIGN PATENT DOCUMENTS

| | | | | |
|---|---|---|---|---|
| JP | 5530721 B2 | | 6/2014 | |
| JP | 2017091242 | * | 5/2017 | |
| JP | 6490034 B2 | * | 3/2019 | ............ B23Q 11/00 |
| JP | 2019-136846 A | | 8/2019 | |
| JP | 2019136846 | * | 8/2019 | |

* cited by examiner

*Primary Examiner* — Phuong Huynh
(74) *Attorney, Agent, or Firm* — BURR PATENT LAW, PLLC

(57) ABSTRACT

A machining accuracy diagnosing device includes a diagnosing information acquiring, an opening time setting unit, a cutting time setting unit, and a machining accuracy influence amount predicting unit. The diagnosing information acquiring unit acquires at least one of a room temperature inside the plant, a set temperature of a temperature regulating device, an air temperature outside the plant, a wind speed outside the plant, an opening degree of the door or the shutter, and a machine body temperature. The opening time setting unit sets an opening time of the door or the shutter. The machining accuracy influence amount predicting unit predicts an influence amount of opening of the door or the shutter on the machining accuracy based on the acquired information for diagnosis, the set opening time of the door or the shutter, and a set scheduled machining start time and a set scheduled machining end time.

2 Claims, 6 Drawing Sheets

FIG.6

| OPENING TIME (MIN) | ACCURACY STABILIZING TIME (MIN) (REQUIRED CUTTING TIME: 4 HOURS, ACCEPTABLE ACCURACY CHANGE: 10 μm) | TIME AT WHICH MACHINING CAN START (WHEN SHUTTER IS OPENED AT 10:00) |
|---|---|---|
| 1~5 | MACHINE ACCURACY CHANGE FALLS WITHIN ACCEPTABLE ACCURACY. | |
| 6 | 147 | 12:33 |
| 7 | 172 | 12:59 |
| 8 | 189 | 13:17 |
| 9 | 201 | 13:30 |
| 10 | 211 | 13:41 |
| 11 | 219 | 13:50 |
| 12 | 225 | 13:57 |
| 13 | 231 | 14:04 |
| 14 | 235 | 14:09 |
| 15 | 239 | 14:14 |
| 16 | 243 | 14:19 |
| 17 | 246 | 14:23 |
| 18 | 249 | 14:27 |
| 19 | 251 | 14:30 |
| 20 | 254 | 14:34 |

MACHINING ACCURACY DIAGNOSING DEVICE AND MACHINING ACCURACY MANAGEMENT SYSTEM FOR MACHINE TOOL

CROSS REFERENCE TO RELATED APPLICATION

This application claims the benefit of Japanese Patent Application Number 2022-014458 filed on Feb. 1, 2022, the entirety of which is incorporated by reference.

FIELD OF THE INVENTION

The disclosure relates to a machining accuracy diagnosing device and a machining accuracy management system for predicting an influence on a machining accuracy in association with opening and closing of an openable and closable door or shutter and avoiding a poor machining accuracy with respect to a machine tool installed inside a plant with the door or shutter.

BACKGROUND OF THE INVENTION

When performing a machining using a machine tool, a change in room temperature inside a plant causes a thermal displacement in the machine tool, resulting in degradation of a machining accuracy of a workpiece.

As a countermeasure against the thermal displacement, a countermeasure that uses an air conditioner, which includes an air-conditioning installation and air-conditioning equipment, is generally taken such that the room temperature inside the plant does not significantly change. However, if advanced temperature management were constantly performed for 24 hours, consumption energy of the air conditioner could increase, and a cost burden also could increase. Furthermore, in some cases, it is difficult in actual production to keep the temperature inside the plant constant at all times. For example, a door or shutter of the plant needs opening and closing to carry in and carry out materials and products, and when the door or shutter is opened, the temperature inside the plant changes. Accordingly, the thermal displacement in the machine tool occurs and raises a problem of degradation of the machining accuracy of a workpiece.

As a countermeasure against the above problem, JP 2019-136846 A discloses a diagnosing method for obtaining temperature change speeds at predetermined parts of a machine tool and calculating an influence of a thermal displacement on an accuracy of the machine tool based on the temperature change speeds.

In addition, Japanese Patent No. 5530721 discloses a method for avoiding a change in room temperature inside a plant in carrying in and carrying out by having double shutters and providing an air curtain, which is controlled to a temperature similar to that of an air conditioner inside a plant, between the two shutters.

The method of JP 2019-136846 A can identify the magnitude of the influence of the thermal displacement. However, if the influence is determined to be large, action, such as delaying a machining start and interrupting the machining, is taken, and loss is caused.

The method of Japanese Patent No. 5530721 has effect in reducing the temperature change inside a plant. However, since the double-shutter structure is necessary, it is difficult to install when a space of the plant is limited.

Therefore, it is an object of the disclosure to provide a machining accuracy diagnosing device and a machining accuracy management system for a machine tool that can appropriately decide a time point of a machining start of a machine tool and decide a method for opening and closing a door or shutter without imposing a negative influence on a machining accuracy of the machine tool. The above object is achieved by quantitatively predicting in advance an influence that the opening and closing of the door or shutter has on the machining accuracy of the machine tool.

SUMMARY OF THE INVENTION

In order to achieve the above-described object, a first configuration of the disclosure is a machining accuracy diagnosing device for a machine tool. The machining accuracy diagnosing device diagnoses a machining accuracy of the machine tool installed inside a plant with an openable and closable door or shutter, and a temperature regulating device. The temperature regulating device controls a room temperature inside the plant or a temperature of the machine tool. The machining accuracy diagnosing device includes a diagnosing information acquiring, an opening time setting unit, a cutting time setting unit, and a machining accuracy influence amount predicting unit. The diagnosing information acquiring unit acquires at least one of the room temperature inside the plant, a set temperature of the temperature regulating device, an air temperature outside the plant, a wind speed outside the plant, an opening degree of the door or the shutter, and a machine body temperature of the machine tool as information for diagnosis. The opening time setting unit sets an opening time of the door or the shutter. The cutting time setting unit sets a scheduled machining start time and a scheduled machining end time by the machine tool. The machining accuracy influence amount predicting unit predicts an influence amount of opening of the door or the shutter on the machining accuracy based on the acquired information for diagnosis, the set opening time of the door or the shutter, and the set scheduled machining start time and the set scheduled machining end time.

In another aspect of the first configuration of the disclosure, which is in the above configuration, the diagnosing information acquiring unit acquires the room temperature inside the plant, the set temperature of the temperature regulating device, the air temperature outside the plant, and the machine body temperature of the machine tool, and the machining accuracy influence amount predicting unit predicts a temperature change of the room temperature inside the plant or the machine body temperature of the machine tool based on the set temperature of the temperature regulating device or the air temperature outside the plant and predicts a thermal displacement of the machine tool based on the predicted temperature change to obtain a change amount of the thermal displacement during a cutting time from the scheduled machining start time to the scheduled machining end time as an influence amount on a machining accuracy.

In another aspect of the first configuration of the disclosure, which is in the above configuration, the machining accuracy influence amount predicting unit predicts the temperature change of the room temperature inside the plant or the machine body temperature of the machine tool using the set temperature of the temperature regulating device as an input when the door or the shutter is closed and using the air temperature outside the plant as an input when the door or the shutter is opened.

Another aspect of the first configuration of the disclosure, which is in the above configuration, further includes an accuracy change acceptable value setting unit and an openable time computing unit. The accuracy change acceptable value setting unit sets an acceptable value of an accuracy change of the machine tool. The openable time computing unit obtains an openable time of the door or the shutter based on a comparison between the influence amount on the machining accuracy predicted by the machining accuracy influence amount predicting unit and the acceptable value of the accuracy change.

Another aspect of the first configuration of the disclosure, which is in the above configuration, further includes an openable time displaying unit that displays the openable time of the door or the shutter obtained by the openable time computing unit.

Another aspect of the first configuration of the disclosure, which is in the above configuration, further includes an accuracy change acceptable value setting unit and a machining start available time computing unit. The accuracy change acceptable value setting unit sets an acceptable value of an accuracy change during the cutting time set by the cutting time setting unit. The machining start available time computing unit obtains a machining start available time that satisfies a condition in which the influence amount on the machining accuracy predicted by the machining accuracy influence amount predicting unit is smaller than the acceptable value of the accuracy change.

Another aspect of the first configuration of the disclosure, which is in the above configuration, further includes a machining start available time displaying unit that displays the machining start available time.

In order to achieve the above-described object, a second configuration of the disclosure is a machining accuracy management system for a machine tool. The machining accuracy management system manages a machining accuracy of a machine tool installed inside a plant with an openable and closable door or shutter. The machining accuracy management system includes the machining accuracy diagnosing device for a machine tool of the first configuration including the openable time computing unit, and a shutter controlling unit that controls opening and closing of the door or the shutter based on the openable time of the door or the shutter.

In order to achieve the above-described object, a second configuration of the disclosure is a machining accuracy management system for a machine tool. The machining accuracy management system manages a machining accuracy of a machine tool installed inside a plant with an openable and closable door or shutter. The machining accuracy management system includes the machining accuracy diagnosing device for a machine tool of the first configuration including the machining start available time computing unit, and a machine tool controlling unit that controls the machine tool to stop a machining or an on-machine measurement before the machining start available time and to start a machining or an on-machine measurement from the machining start available time onwards.

With the disclosure, the influence that a room temperature change caused by opening and closing of a door or shutter has on the machining accuracy of a machine tool can be quantitatively predicted. Accordingly, a time point of a machining start with the machine tool can be appropriately decided, and a method for opening and closing the door or shutter without imposing a negative influence on the machining accuracy of the machine tool can be decided.

With another aspect of the first configuration, in addition to the above effect, the machining accuracy influence amount predicting unit can accurately estimate the influence on an actual workpiece accuracy by predicting changes of a room temperature inside a plant and a machine body temperature of a machine tool by opening and closing a door or shutter from a calculation using a physical model, predicting a thermal displacement of the machine tool based on the changes, and obtaining a change amount of the predicted thermal displacement during a cutting time.

With another aspect of the first configuration, in addition to the above effects, by changing a prediction method of the room temperature change according to an opening and closing condition of a door or shutter, the room temperature change inside a plant can be predicted with accuracy.

With another aspect of the first configuration, in addition to the above effects, an openable time of the door or shutter that satisfies a condition in which a predicted influence amount on the machining accuracy becomes equal to or less than the acceptable value of the accuracy change can be known. It is effective when a machining schedule is predetermined and the door or shutter needs opening for carrying in and carrying out before the machining start.

With another aspect of the first configuration, in addition to the above effects, a door or shutter can be opened and closed considering the influence on the machining accuracy by displaying an openable time of the door or shutter and notifying an operator of the openable time. It can avoid a problem in which an operator who is not involved with a machining and does not know a schedule of the machining or a necessary accuracy opens the door or shutter for a long time without knowing, resulting in degradation of the machining accuracy.

With another aspect of the first configuration, in addition to the above effects, by predicting a period until an influence of the room temperature change by opening a door or shutter settles and the influence amount on the machining accuracy becomes equal to or less than the acceptable value and presenting the period as a machining start available time, the machining schedule can be created considering the influence on the machining accuracy. The method is effective when the period for which the door or shutter is left open for carrying in and carrying out is predetermined.

With another aspect of the first configuration, in addition to the above effects, by displaying the machining start available time to make it known to operators, a poor machining accuracy caused by starting a machining in a state where the accuracy change of a machine tool is large can be avoided.

With second configuration, in addition to the above effects, by controlling opening and closing of a door or shutter based on the calculated openable time, carrying in and carrying out can be performed at a time point when the influence on the machining accuracy is small.

With second configuration, in addition to the above effects, by controlling a machining or on-machine measurement to be stopped or started based on the calculated machining start available time, the machining or on-machine measurement can be performed with high accuracy.

BRIEF DESCRIPTION OF THE DRAWINGS

FIG. 6 is a table that represents a relationship between a shutter opening time and an accuracy stabilizing time.

DETAILED DESCRIPTION OF THE INVENTION

The following describes embodiments of the disclosure based on the drawings.

Figure 1:
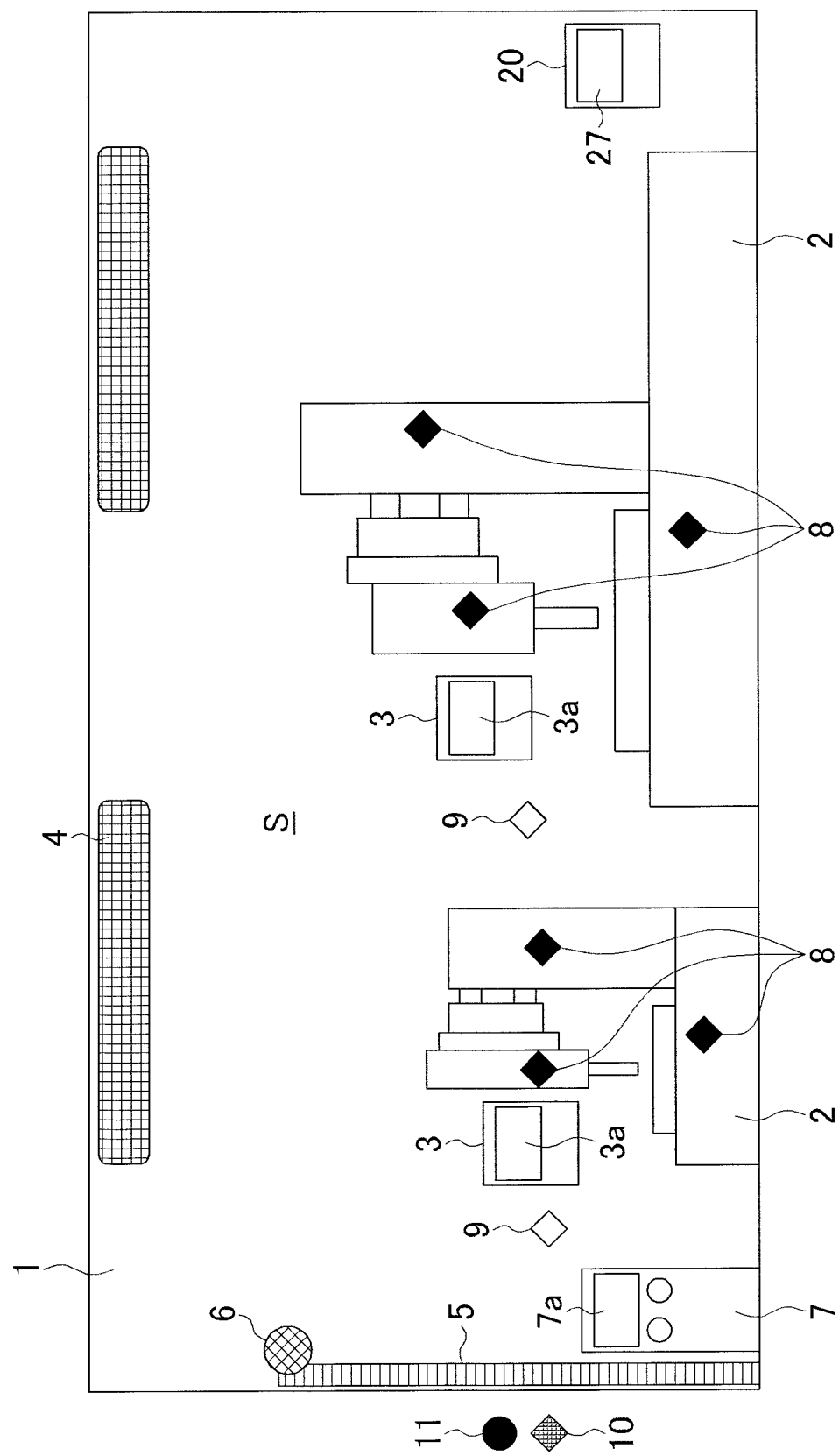
FIG. 1 is a conceptual diagram of a plant where a machining accuracy diagnosing device and a machining accuracy management system are applied.

FIG. 1 illustrates a plant 1 where a machining accuracy diagnosing device 20 that is one example of a first configuration of the disclosure and a machining accuracy management system S that is one example of a second configuration are applied.

In the plant 1, machine tools 2, 2 are installed. As illustrate in the drawing, the machine tool 2 need not be one machine, and a plurality of different types of machines may be present. A control device 3 of the machine tool 2 is mounted on each machine tool 2, and information related to the machine tool 2 can be displayed on a displaying unit 3a. In the plant 1, an air conditioner 4, which includes an air-conditioning installation and a single unit of air-conditioning equipment, that controls a temperature inside the plant 1, a shutter 5 that opens and closes an opening portion when materials and products are carried in and carried out and the like, a shutter driving device 6 that operates opening and closing of the shutter 5, and a shutter opening and closing device 7 that controls the shutter driving device 6 are included. The opening and closing of the opening portion may be performed by a door in place of the shutter 5.

In each part of the machine tool 2, a machine body temperature sensor 8 is installed. In the plant 1, a plurality of room temperature sensors 9, 9 . . . are installed. Outside the shutter 5 of the plant 1, an outside air temperature sensor 10 is installed. Furthermore, outside the shutter 5, a wind speed indicator 11 is mounted such that a wind state outside the plant 1 can be measured.

In the example, while the air conditioner 4 that controls the room temperature inside the entire plant 1 is installed as a temperature regulating device, instead of an air conditioner, the temperature regulating device may be a temperature regulating device that directly controls the temperature of the machine tool 2. For example, the temperature regulating device is considered to be a device that seals circumference of the machine tool 2 to air-condition the inside or a device in which an oil jacket is installed on a machine body of the machine tool 2 to flow a coolant with a temperature controlled.

The machining accuracy management system S of the machine tool 2 is configured to include the machining accuracy diagnosing device 20, the control device 3 that performs inputting/outputting of information with the machining accuracy diagnosing device 20, and the shutter opening and closing device 7.

Set temperature information of the air conditioner 4, detected temperatures of the temperature sensors 8 to 10, a wind speed outside the plant 1 by the wind speed indicator 11, and information on an opening degree of the shutter 5 by the shutter driving device 6 are input to the machining accuracy diagnosing device 20. The machining accuracy diagnosing device 20 predicts an influence amount of the opening of the shutter 5 on a machining accuracy of the machine tool 2 based on the input information and decides an opening time of the shutter 5 for which the machining accuracy is stabilized and a machining start available time. The decided result is output to the control device 3 and the shutter opening and closing device 7. However, the machining accuracy diagnosing device 20 may be built into the control device 3 or the shutter opening and closing device 7 or may be built into another information device network-connected to the control device 3 and the shutter opening and closing device 7. Accordingly, the machining accuracy diagnosing device 20 may be positioned outside the plant 1.

Figure 2:
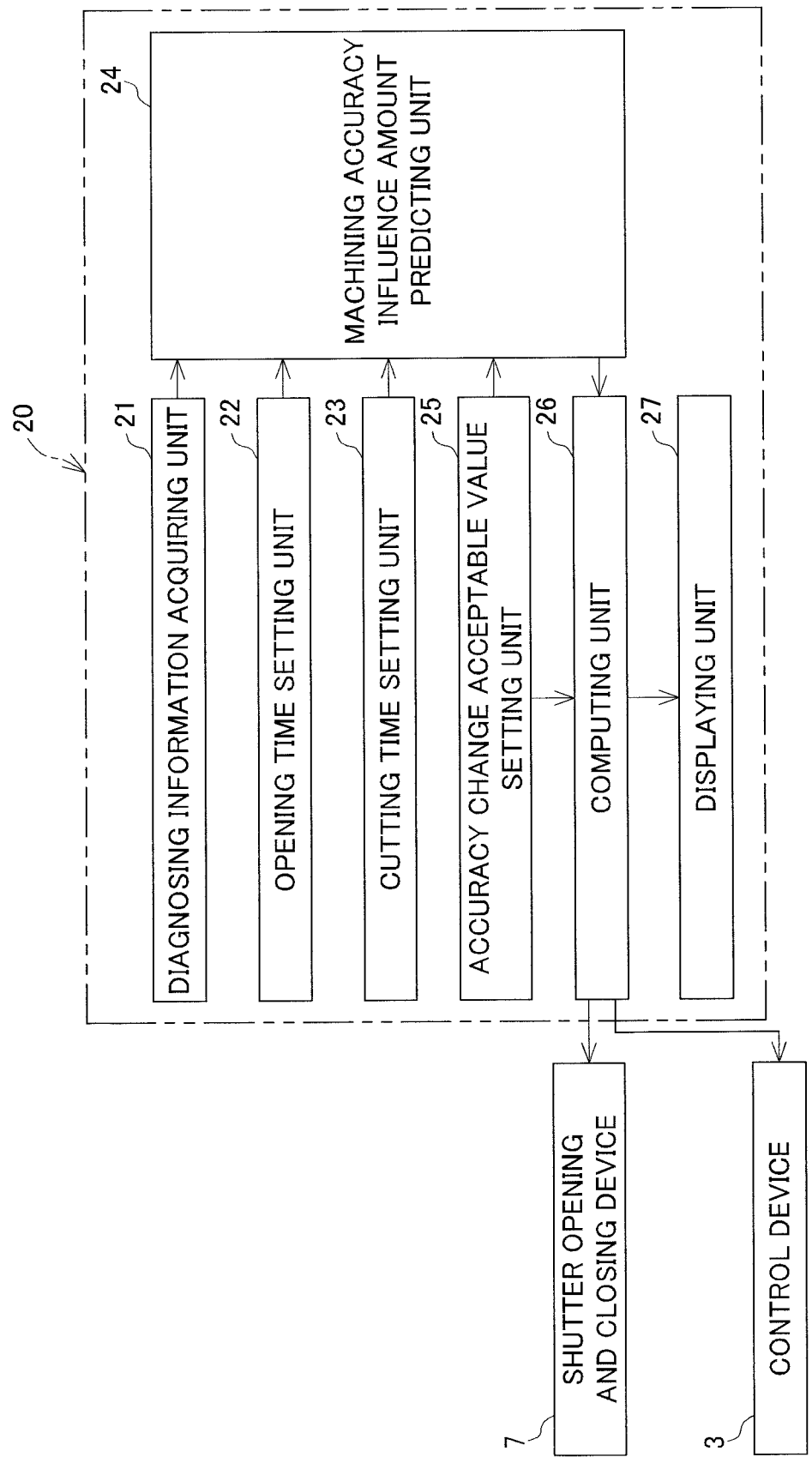
FIG. 2 is a block diagram illustrating a configuration of the machining accuracy diagnosing device.

As illustrated in FIG. 2, the machining accuracy diagnosing device 20 includes a diagnosing information acquiring unit 21, an opening time setting unit 22, a cutting time setting unit 23, a machining accuracy influence amount predicting unit 24, an accuracy change acceptable value setting unit 25, a computing unit 26, and a displaying unit 27. The machining accuracy diagnosing device 20 includes a central processing unit (CPU) and a memory connected to the CPU and ensures the operations.

As information for diagnosis, the set temperature information of the air conditioner 4, the detected temperatures of the temperature sensors 8 to 10, the wind speed outside the plant 1 by the wind speed indicator 11, the information on the opening degree of the shutter 5 by the shutter driving device 6 are input to the diagnosing information acquiring unit 21. The diagnosing information acquiring unit 21 is one example of a diagnosing information acquiring unit of the disclosure.

In the opening time setting unit 22, the opening time of the shutter 5 in carrying in materials and carrying out products and the like can be set arbitrarily by an input unit that is not illustrated. The opening time setting unit 22 is one example of an opening time setting unit of the disclosure.

In the cutting time setting unit 23, a scheduled machining start time and a scheduled machining end time of the machine tool 2 can be set by an input unit that is not illustrated. The cutting time setting unit 23 is one example of a cutting time setting unit of the disclosure.

The machining accuracy influence amount predicting unit 24 predicts a temperature change of a machine body temperature of the machine tool 2 based on the information for diagnosis acquired by the diagnosing information acquiring unit 21 and the opening time of the shutter 5 set by the opening time setting unit 22 and predicts a thermal displacement of the machine tool 2 based on the predicted temperature change and the scheduled machining start lime and the scheduled machining end time set by the cutting time setting unit 23 to obtain an accuracy change by the thermal displacement as an influence amount on the machining accuracy. The machining accuracy influence amount predicting unit 24 is one example of a machining accuracy influence amount predicting unit of the disclosure.

In the accuracy change acceptable value setting unit 25, an acceptable value of the accuracy change during a cutting time of the machine tool 2 can be set arbitrarily by an input unit that is not illustrated. The accuracy change acceptable value setting unit 25 is one example of an accuracy change acceptable value setting unit of the disclosure.

The computing unit 26 obtains a shutter openable time that has a small influence on the machine body temperature change and a machining start available time based on the influence amount on the machining accuracy obtained by the machining accuracy influence amount predicting unit 24 and the acceptable value set by the accuracy change acceptable value setting unit 25. The computing unit 26 is one example of an openable time computing unit and a machining start available time computing unit of the disclosure.

The displaying unit 27 displays a diagnosing result, such as a computing result by the computing unit 26.

In opening the shutter 5, when an air temperature difference between inside the plant 1 and outside the plant 1 is small, the influence on the machining accuracy is small even if the shutter 5 is opened. However, when the air temperature difference is large, the room temperature significantly changes by the opening, and therefore, the influence on the machining accuracy becomes large. At this time, since the room temperature change inside the plant 1 is large for a while after opening and closing the shutter 5, the influence on the machining accuracy becomes large. However, after time passes sufficiently, the room temperature change inside the plant 1 becomes slow, and the influence on the machining accuracy becomes small. By setting a time at which the predicted influence on the machining accuracy is expected to be smaller than the acceptable value as a machining start time, a machining schedule can be decided so as not to cause a poor machining accuracy.

The influence on the machining accuracy changes also depending on a length of an opening and closing time of the shutter 5, and if the opening and closing take place for a very short time, the influence on the machining accuracy is small in some cases. Therefore, by predicting the influence on the machining accuracy and displaying the openable time, carrying in and carrying out can be planed so as not to affect the machining accuracy.

Figure 3:
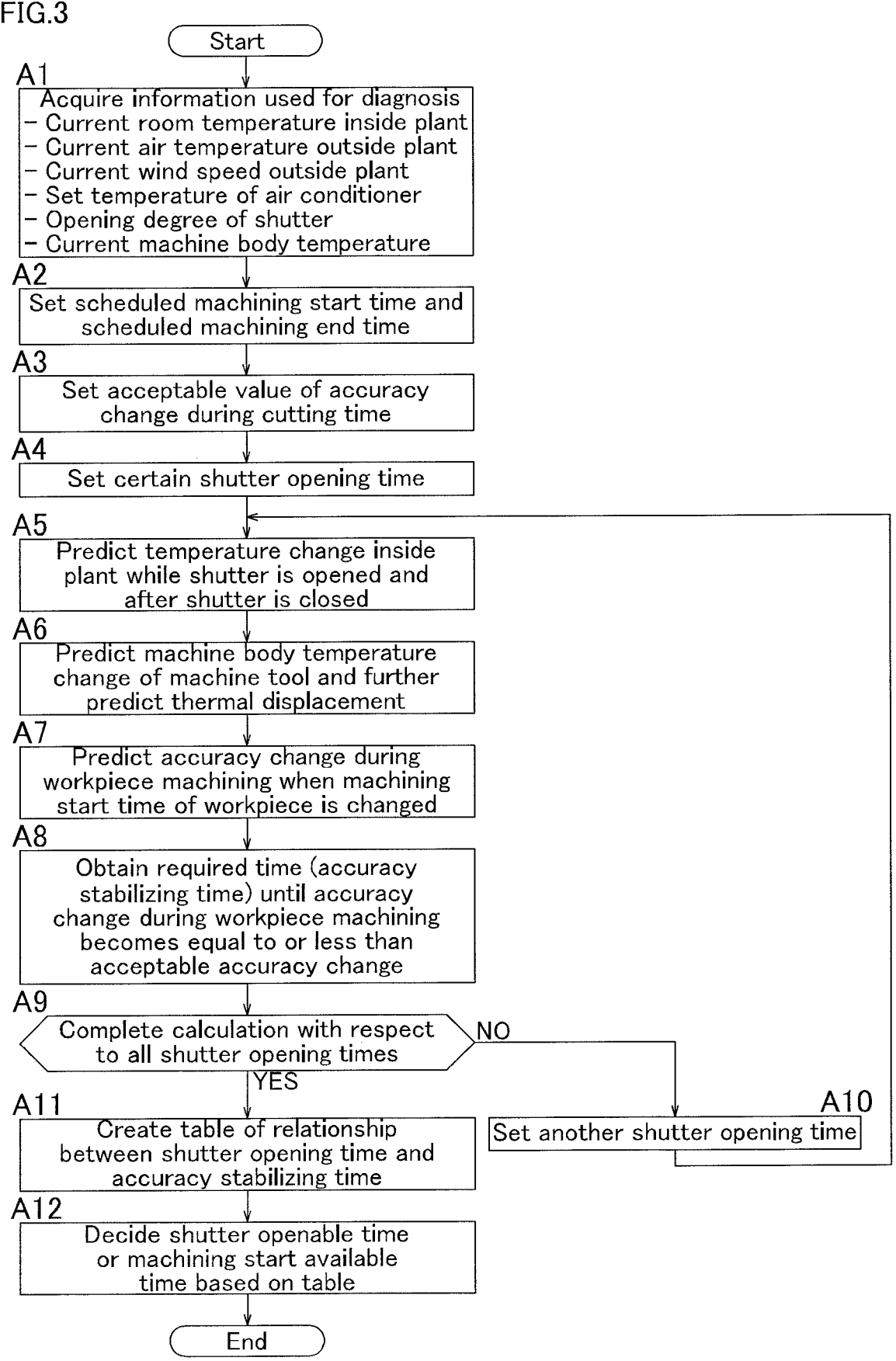
FIG. 3 is a flowchart illustrating a process of the machining accuracy diagnosing device.
Figure 4:
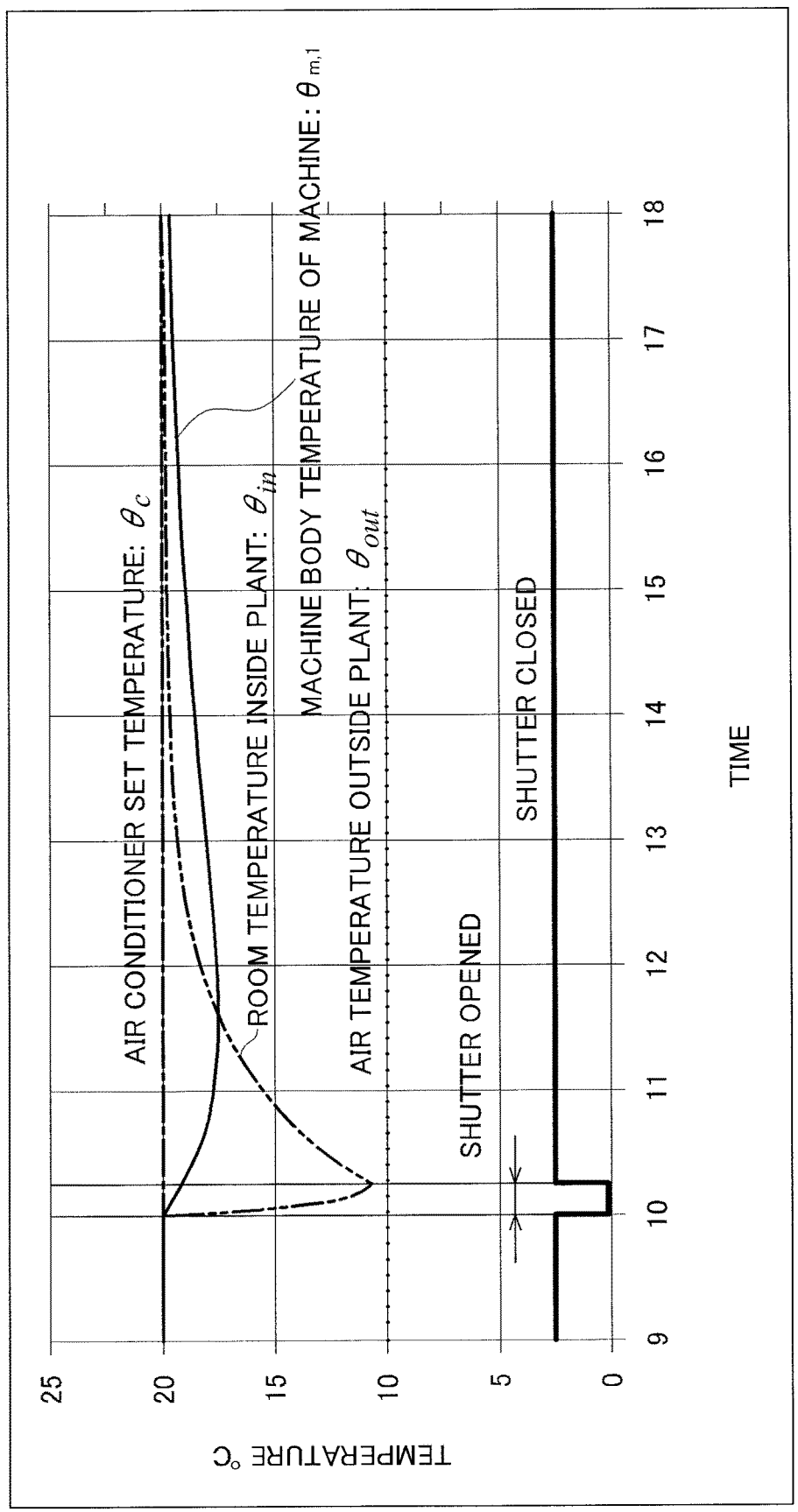
FIG. 4 is a graph that represents a temperature change prediction result by shutter opening.

The following describes a method in which the machining accuracy diagnosing device 20 predicts the accuracy change of the machine tool 2 to decide the machining schedule and obtain the shutter openable time so as not to cause a poor machining accuracy using a flowchart of FIG. 3 and a graph of the temperature change of FIG. 4.

Phase A1: Acquiring the information for diagnosis by the diagnosing information acquiring unit 21.

As the information for diagnosis, the current room temperature inside the plant 1, the current air temperature outside the plant 1, the current wind speed outside the plant 1, the set temperature of the air conditioner 4, the opening degree of the shutter 5, and the current machine body temperature of the machine tool 2 are acquired.

Phase A2: Setting the scheduled machining start time and the scheduled machining end time by the cutting time setting unit 23.

Phase A3: Setting the acceptable value of the accuracy change during the cutting time by the accuracy change acceptable value setting unit 25.

In Phases A2 and A3, as information related to the machining, the machining schedule and the acceptable value of the accuracy change are set. For example, for machining programs prepared according to types of workpieces to be machined and machining phases such as rough machining and finish machining, required cutting times and required machining accuracies of them are set, and the scheduled machining start times are set. In the embodiment, it is assumed that a machining is performed for the required cutting time of four hours and with the required machining accuracy of 10 μm. Assuming that the scheduled machining start time is set to 14:00, the acceptable value of the accuracy change of the machine tool 2 between 14:00 and 18:00, that is, the scheduled machining end time, is 10 μm.

Phase A4: Setting a certain shutter opening time by the opening time setting unit 22.

After the shutter opening time is set, the process from Phase A5 onwards is performed by the machining accuracy influence amount predicting unit 24. When the shutter opening time is predetermined and the machining start available time is obtained, the process is performed only once. At this time, the shutter opening time may be set by inputting from a screen or the like or may be automatically set upon acquiring an opening and closing condition from the shutter opening and closing device 7.

When the machining schedule is determined and the openable time of the shutter 5 is obtained with respect to the machining schedule, various shutter opening times are assumed, and the process from Phase A5 to Phase A10 is repeated. For the shutter opening times with which calculations are performed, for example, a rule, such as "the shutter opening time shall fall between 0 to 1200 seconds in increments of 30 seconds", is decided in advance.

Phase A5: Predicting the room temperature change, which is the temperature change, inside the plant 1 when the shutter 5 is opened and after the shutter 5 is closed. When the shutter 5 is opened, as expressed in the following Formula 1 and Formula 2, a room temperature $\theta_m$ in the plant 1 approaches an air temperature $f_{out}$ outside the plant 1.

$$f_{in}=(\theta_{out}-\theta_{in0})e^{-(t-t_0)/T_{open}}\theta_{in}(t_0 \leq t \leq t_1) \quad \text{(Formula 1)}$$

$\theta_{in}$: Room temperature inside plant (predicted value)
$\theta_{in0}$: Room temperature inside plant at the time of shutter opening ($t=t_0$)
$\theta_{out}$: Air temperature outside plant
$T_{open}$: Time constant representing delay in temperature change inside plant with respect to outside air temperature at the time of shutter opening
$t_0$: Time to open shutter
$t_1$: Time to close shutter $$T_{open} = \frac{K}{v^p A} \quad \text{(Formula 2)}$$

v: Wind speed outside plant
A: Area of shutter opening portion
p, K: Constants

After the shutter 5 is closed again, as expressed in the following Formula 3, the room temperature $\theta_{in}$ inside the plant 1 approaches a set temperature $\theta_c$ of the air conditioner 4.

$$\theta_{in}=(\theta_c-\theta_{in})e^{-(t-t_1)T_f}+\theta_{in1}(t_1 \leq t) \quad \text{(Formula 3)}$$

$\theta_m$: Room temperature inside plant (predicted value)
$\theta_{m1}$: Room temperature inside plant when shutter is closed again ($t=t_1$)
$\theta_c$: Set temperature of air conditioner of plant
$T_f$: Time constant representing delay in room temperature change inside plant with respect to air conditioner Similarly to a case of Formula 1, Formula 3 is a formula of a first-order lag step response and expresses following capability to the room temperature change by values of the time constant $T_{open}$ and the time constant $T_f$. The value of the time constant $T_{open}$ that represents a delay in the room temperature change inside the plant 1 with respect to the outside air temperature at the time of shutter opening is considered to vary depending on a size of a space inside the plant 1, a size of the opening portion of the shutter 5, presence/absence of wind outside the plant 1, and the like.

Among the above-described factors, the area of the opening portion of the shutter 5 varies depending on the opening degree of the shutter 5, and the wind outside the plant 1 changes in condition moment by moment. Therefore, by acquiring information of the opening degree of the shutter 5 and the wind outside the plant 1 and obtaining the time constant $T_{open}$ as a function of them, an accurate estimation that is more adapted to the condition can be performed. Formula 2 is one example of it, and the constant is decided and used based on calculation and measurement data. As a function to obtain a time constant, a formula in another form may be used. Additionally, the value of the time constant $T_f$ that expresses a delay of the room temperature change inside the plant 1 with respect to the air conditioner 4 varies depending on the size of the space inside the plant 1, an output of the air conditioner 4, an operation state of machines inside the plant 1, and the like. If the value is identified in advance, the room temperature change after the air conditioner 4 is turned on can be predicted. While in the embodiment, Formula 1 to Formula 3 are used to predict the room temperature change, another formula may be used for prediction based on measurement results, and the like.

Phase A6: Predicting the machine body temperature change of the machine tool 2 when the room temperature changes as predicted by Phase A5 and predict the thermal displacement of the machine tool 2 based on the machine body temperature change. When the room temperature in the environment where the machine tool 2 is installed changes, the machine body temperature changes with a delay from the room temperature change. The machine body temperature change at this time can be expressed by a first-order lag response in which the room temperature change is input. The response can be obtained by successively calculating using a difference equation as expressed in the following Formula 4.

$$\theta_{m,i}(n) = \theta_{m,i}(n-1) + \frac{\Delta t}{\Delta_t + T_{m,i}} + \{\theta_{in}(n) - \theta_{m,i}(n-1)\} \quad \text{(Formula 4)}$$

$$i = 1, 2, \ldots, N$$

$\theta_{in}(n)$: Room temperature inside plant, where n=0 is a current temperature (measured value)

$\theta_{m,i}(n)$: Machine body temperature of machine tool, where n=0 is a current temperature (measured value)

$T_{m,i}$: Time constant of machine body temperature change with respect to room temperature change $\Delta t$: Cycle of calculation (i is a subscript representing a temperature sensor position.)

The calculation of Formula 4 is performed for each machine tool 2 and each temperature measuring point to estimate the machine body temperature change for each part when the room temperature changes predicted by Formula 1 to Formula 3 occur. Furthermore, from the estimated machine body temperature changes of the machine tool 2, the accuracy change due to the thermal displacement of the machine tool 2 is predicted. The accuracy change due to the thermal displacement can be expressed by a function of the machine body temperature as expressed in the following Formula 5. Hereinafter, the function is referred to as an accuracy change function of the machine tool 2. What sort of function the accuracy change function should be is decided in advance based on an experiment and an analysis.

$$\Delta X_m = F_2(\theta_{m,i}, \theta_{m,2}, \ldots, \theta_{m,N}) \quad \text{(Formula 5)}$$

$\Delta X_m$: Accuracy change function of machine tool

In the embodiment, while the temperature change of the machine body is predicted using the current temperature information by installing the machine body temperature sensors 8 in the machine tool 2, the machine body temperature sensors 8 do not necessarily need to be installed to predict the accuracy change of the machine tool 2. As a variable of the accuracy change function of the machine tool 2, a variable other than the machine body temperature, for example, a variation of the room temperature around the machine can be used.

Phase A7: Predicting the thermal displacement during a workpiece machining when the machining start time of the workpiece is changed, here. A thermal displacement $\Delta X_w$ during workpiece machining can be obtained by the following Formula 6.

$$\Delta X_w = \max_{t_{w,start} \leq t \leq t_{w,end}}(\Delta X_m) - \min_{t_{w,start} \leq t \leq t_{w,end}}(\Delta X_m) \quad \text{(Formula 6)}$$

Figure 5:
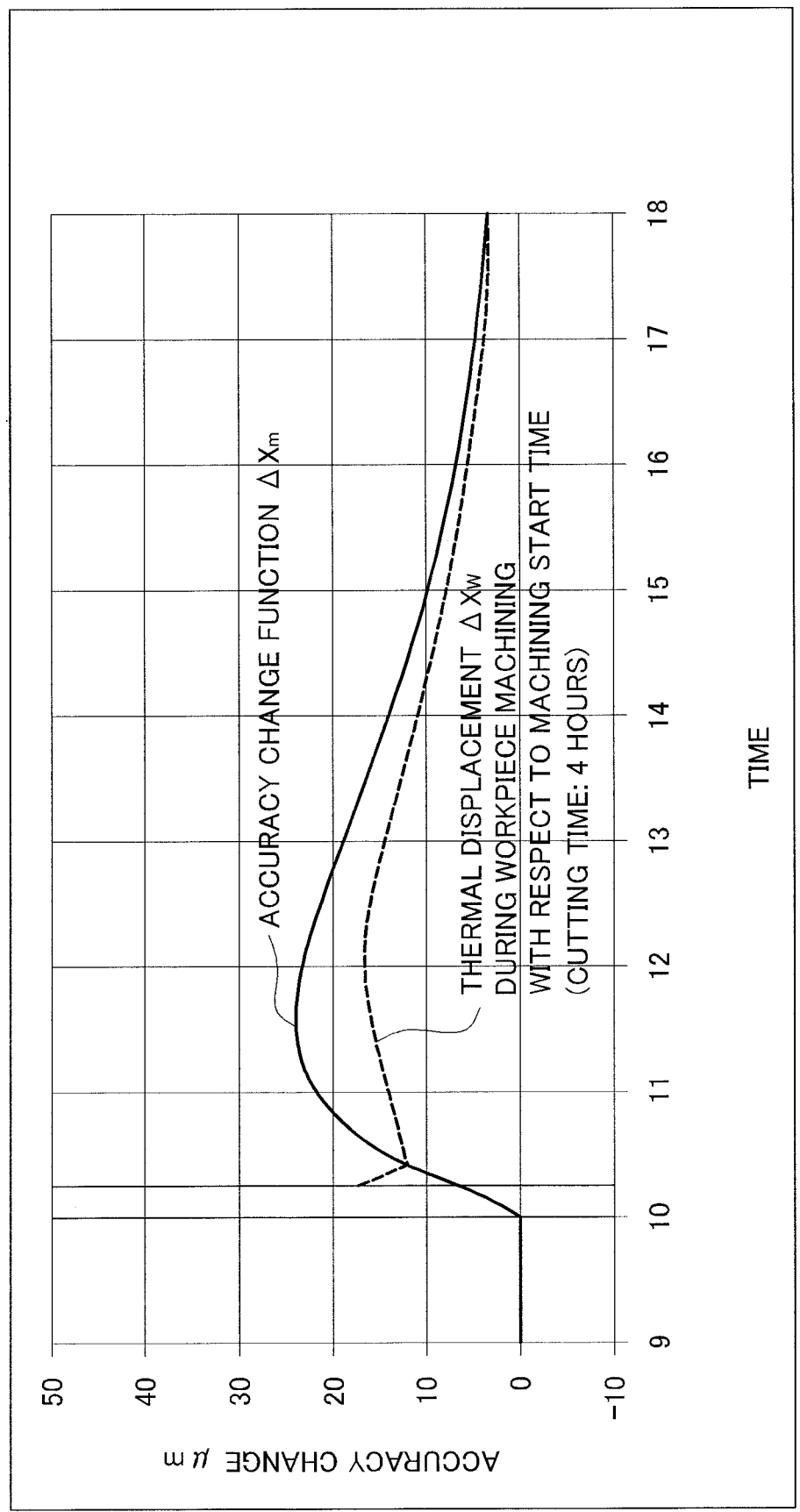
FIG. 5 is a graph that represents a calculation result of an accuracy change function by shutter opening.

$\Delta X_w$: Thermal displacement during workpiece machining $t_{w,start}$: Machining start time of workpiece $t_{w,end}$: Machining end time of workpiece Since the time required for the machining of the workpiece is constant, when the machining start time of workpiece $t_{w,start}$ is shifted to a later time, the machining end time of workpiece $t_{w,end}$ is also shifted to a later time. The thermal displacement $\Delta X_w$ during workpiece machining is obtained while changing $t_{w,start}$ and $t_{w,end}$. A relationship between the machining start time and the accuracy change during the workpiece machining is obtained, for example, as illustrated in FIG. 5. In this example, the cutting time of the workpiece is assumed to be four hours. It can be seen that as time passes from the opening and closing of the shutter 5, the value of the thermal displacement during the workpiece machining decreases.

Phase A8: Recording a workpiece machining start time when the thermal displacement during the workpiece machining predicted in Phase A7 becomes equal to or less than the acceptable value of the accuracy change. Accordingly, a required time, that is, an accuracy stabilizing time, until the thermal displacement during the workpiece machining becomes equal to or less than the acceptable value of the accuracy change can be obtained with respect to the certain shutter opening time.

Phase A9: Determining whether or not the calculations have ended with respect to all the preset shutter opening times.

Phase A10: Setting another shutter opening time and performing the calculations of Phase A5 to Phase A8 again when the calculations have not ended with respect to all the preset shutter opening times.

Phase A11: Creating a table of a relationship between the shutter opening time and the accuracy stabilizing time when the calculations end with respect to all the preset shutter opening times.

Phase A12: Deciding the shutter openable time or the machining start available time based on the table by the computing unit 26.

Based on the above flow, an example of obtaining the shutter openable time is illustrated in FIG. 4 to FIG. 6. In this example, a case where the shutter 5 is opened at 10:00 a.m. to carry in materials and perform a machining in the afternoon is assumed. How long of a time is required until the temperature change of a machine settles depending on the length of a time during which the shutter 5 is opened is obtained by a calculation, thereby allowing the machining accuracy to be ensured. In this simulation, for easy understanding of the result, the set temperature $\theta_c$ of the air conditioner 4 indicated by the one-dot chain line in FIG. 4 is assumed to be constant at 20° C., and the air temperature $\theta_{out}$ of the plant 1 indicated by the dotted line is assumed to be constant at 10° C. Additionally, in the example, the accuracy change function $\Delta X_m$ of the machine tool 2 is calculated by the following Formula 7 assuming that it is proportionate to the difference between an actual machine body temperature at a certain point and a reference temperature (20° C.).

$$\Delta X_m = 10 \times (20 - \theta_{m,1}) \quad \text{(Formula 7)}$$

FIG. 4 is the prediction result of the room temperature change inside the plant 1 and the machine body temperature change of the machine tool 2 when the shutter 5 is assumed to be opened for 15 minutes. In FIG. 4, a calculation is performed by setting the time constant at the time of shutter opening $T_{open}$ to five minutes and the time constant $T_f$ when the shutter 5 is closed is 60 minutes. Since a cool outside air flows into the plant 1 when the shutter 5 is opened, as indicated by the two-dot chain line, the room temperature $\theta_{in}$ of the plant 1 lowers rapidly in a short time. After the shutter 5 is closed, it returns gradually to the set temperature $\theta_c$ by the effect of the air conditioner 4. At this time, the machine body temperature $\theta_{m,1}$ of the machine tool 2 also changes as indicated by the solid line but slowly changes with a delay from the room temperature change. In view of this, while the machine body temperature significantly changes when the shutter 5 is opened for a long time, the influence on the machine body temperature is small if the shutter 5 is opened for a very short time.

From the machine body temperature change predicted as illustrated in FIG. 4, the accuracy change function obtained according to Formula 6 when assuming that the shutter 5 is opened for 15 minutes is as illustrated in FIG. 5. Based on a time change of the accuracy change function, the thermal displacement $\Delta X_w$ during workpiece machining obtained with respect to the machining start time is as indicated by the dashed line. Here, the cutting time of the workpiece is assumed to be four hours. For example, the value of the dashed line at 13:00 is approximately 15 μm, and it indicates that a change in the thermal displacement, which is a difference between the maximum value and the minimum value, when the machining is performed from 13:00 to 17:00 becomes 15 μm. By reading from the graph, it can be seen that it is only necessary to start the machining from 14:14 onwards when the acceptable value of the accuracy change is 10 Thus, the machining start available time that satisfies the condition in which the accuracy change of the machine tool 2 during the workpiece machining is smaller than the acceptable value is obtained. The obtained machining start available time is displayed on the displaying unit 3a of the control device 3 of the machine tool 2 to call a user's attention, thereby allowing avoidance of a poor machining accuracy. The displaying unit 3a is one example of a machining start available time displaying unit of the disclosure.

Alternatively, the control device 3 controls the machine tool 2 to stop the machining or an on-machine measurement before the machining start available time and to start the machining or the on-machine measurement from the machining start available time onwards, thereby allowing avoidance of a poor machining accuracy. The control device 3 is one example of a machine tool controlling unit of the disclosure.

When the calculation of the machining start available time is performed with respect to various shutter opening times, a table as illustrated in FIG. 6 is obtained. It can be seen from the table that, for example, the shutter opening time should be within 12 minutes if it is desired to start the machining at 14:00. In addition, it can be seen that, if the shutter opening time is equal to or less than five minutes, the influence on the machining accuracy is small and does not exceed the acceptable accuracy change, that is, the acceptable value of the accuracy change. By displaying the information on a displaying unit 7a of the shutter opening and closing device 7 or the like, the shutter 5 can be opened and closed considering the influence on the workpiece machining accuracy. A method for displaying the shutter openable time obtained from the machining start time and the acceptable value of the accuracy change on the displaying unit 7a and the displaying unit 27 of the machining accuracy diagnosing device 20 and sounding a warning buzzer or the like when the time is approaching can be also considered. The displaying units 7a and 27 are exemplified by an openable time displaying unit of the disclosure.

Alternatively, the shutter opening and closing device 7 may control the opening and closing of the shutter 5 based on the shutter openable time. The shutter opening and closing device 7 is one example of a shutter controlling unit of the disclosure. In addition, a method for automatically performing carrying in and carrying out at a time point at which the influence on the workpiece machining accuracy is small using an automatic guided vehicle (AGV) and the like can be also considered. With the accuracy management system, a problem in which an operator who is not involved with a machining opens and closes the shutter 5 without knowing, causing a negative influence on the machining accuracy, can be avoided.

While the accuracy change function is obtained in Formula 7 assuming that it is simply proportionate to the machine body temperature at a certain position, the formula of the accuracy change function can be set arbitrarily. For example, for the accuracy change function, a formula of variations of the room temperatures and the machine body temperatures at a plurality of points, a differential value of the temperature change, or the like can be considered.

Thus, the machining accuracy diagnosing device 20 and the machining accuracy management system S of the above embodiment includes the diagnosing information acquiring unit 21, the opening time setting unit 22, the cutting time setting unit 23, and the machining accuracy influence amount predicting unit 24. The diagnosing information acquiring unit 21 acquires the room temperature inside the plant 1, the set temperature of the air conditioner 4, the air temperature outside the plant 1, the wind speed outside the plant 1, the opening degree of the shutter 5, and the machine body temperature of the machine tool 2 as the information for diagnosis. The opening time setting unit 22 sets the opening time of the shutter 5. The cutting time setting unit 23 sets the scheduled machining start time and the scheduled machining end time by the machine tool 2. The machining accuracy influence amount predicting unit 24 predicts the influence amount of the opening of the shutter 5 on the machining accuracy based on the acquired information for diagnosis, the set opening time of the shutter 5, and the set scheduled machining start time and the set scheduled machining end time.

With the configuration, the influence that the room temperature change caused by the opening and closing of the shutter 5 has on the machining accuracy of the machine tool 2 can be quantitatively predicted. Accordingly, the time point of the machining start with the machine tool 2 can be appropriately decided, and the method for opening and closing the shutter 5 without imposing a negative influence on the machining accuracy of the machine tool 2 can be decided.

In the above embodiment, using the formulae based on the physical model as indicated in Formula 1 to Formula 5, the room temperature change, the machine body temperature change of the machine tool, and the thermal displacement of the machine tool are calculated in this order to calculate the influence amount on the machining accuracy. However, when the influence amount on the machining accuracy is obtained, the calculation based on a theoretical formula need not be necessarily performed. For example, using a method of machine learning, a model that calculates the influence amount on the machining accuracy can be created using the cutting time, temperature information, and the like as inputs. Accordingly, the acquired information for diagnosis is not limited to all of the room temperature inside the plant, the set temperature of the air conditioner, the air temperature outside the plant, the wind speed outside the plant, the opening degree of the shutter, and the machine body temperature of the machine tool as in the above embodiment. By acquiring at least one of them, the influence amount on the machining accuracy can be predicted.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A machining accuracy management system for a machine tool configured to machine a workpiece, the machining accuracy management system managing a machining accuracy of the machine tool installed inside a plant with an openable and closable door or shutter, and a temperature regulating device, the temperature regulating device controlling a room temperature inside the plant or a temperature of the machine tool, the machining accuracy management system comprising:
   a machine accuracy diagnosing device comprising:
      a diagnosing information acquiring unit that acquires at least one of the room temperature inside the plant, a set temperature of the temperature regulating device, an air temperature outside the plant, a wind speed outside the plant, an opening degree of the door or the shutter, and a machine body temperature of the machine tool as information for diagnosis;
      an opening time setting unit that sets an opening time of the door or the shutter;
      a cutting time setting unit that sets a scheduled machining start time and a scheduled machining end time for machining of the workpiece by the machine tool; and
      a machining accuracy influence amount predicting unit that predicts an influence amount of opening of the door or the shutter on the machining accuracy of the workpiece by the machine tool based on the acquired information for diagnosis, the set opening time of the door or the shutter, and the set scheduled machining start time and the set scheduled machining end time;
      an accuracy change acceptable value setting unit that sets an acceptable value of an accuracy change during the cutting time set by the cutting time setting unit; and
      an openable time computing unit that obtains an openable time of the door or the shutter based on a comparison between the influence amount on the machining accuracy of the workpiece by the machine tool predicted by the machining accuracy influence amount predicting unit and the acceptable value of the accuracy change; and
   a shutter controlling device that controls opening and closing of the door or the shutter based on the openable time of the door or shutter;
   wherein the machining accuracy management system predicts an influence that opening the door or shutter has on the machining accuracy of the machine tool prior to machining the workpiece.

2. A machining accuracy management system for a machine tool configured to machine a workpiece, the machining accuracy management system managing a machine accuracy of the machine tool installed inside a plant with an openable and closeable door or shutter, and a temperature regulating device, the temperature regulating device controlling a room temperature inside the plant or a temperature of the machine tool, the machining accuracy management system comprising:
   a machining accuracy diagnosing device comprising:
      a diagnosing information acquiring unit that acquires at least one of the room temperature inside the plant, a set temperature of the temperature regulating device, an air temperature outside the plant, a wind speed outside the plant, an opening degree of the door or the shutter, and a machine body temperature of the machine tool as information for diagnosis;
      an opening time setting unit that sets an opening time of the door or the shutter;
      a cutting time setting unit that sets a scheduled machining start time and a scheduled machining end time for machining of the workpiece by the machine tool;
      a machining accuracy influence amount predicting unit that predicts an influence amount of opening of the door or the shutter on the machining accuracy of the workpiece by the machine tool based on the acquired information for diagnosis, the set opening time of the door or the shutter, and the set scheduled machining start time and the set scheduled machining end time;
      an accuracy change acceptable value setting unit that sets an acceptable value of an accuracy change during the cutting time set by the cutting time setting unit; and
      a machining start available time computing unit that obtains a machining start available time that satisfies a condition in which the influence amount on the machining accuracy of the workpiece by the machine tool predicted by the machining accuracy influence amount predicting unit is smaller than the acceptable value of the accuracy change; and
   a machine tool controlling device,
   wherein the machine tool controlling device that controls the machine tool to stop machining or an on-machine measurement before the machining start available time and to start a machining or an on-machine measurement from the machining start available time onwards; and
   wherein the machining accuracy management system predicts an influence that opening the door or shutter has on the machining accuracy of the machine tool prior to machining the workpiece.

* * * * *